United States Patent
Knutson et al.

(10) Patent No.: US 11,107,357 B2
(45) Date of Patent: Aug. 31, 2021

(54) PROCESS AND SYSTEM FOR ASSISTING VEHICLE OPERATIONS WITH SAFE PASSING

(71) Applicant: Aptiv Technologies Limited, St. Michael (BB)

(72) Inventors: Eric P. Knutson, Kokomo, IN (US); David M. Spell, Kokomo, IN (US); Linh N. Pham, Kokomo, IN (US)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 0 days.

(21) Appl. No.: 16/690,882

(22) Filed: Nov. 21, 2019

(65) Prior Publication Data

US 2021/0158706 A1 May 27, 2021

(51) Int. Cl.
| | |
|---|---|
| *B60K 35/00* | (2006.01) |
| *G08B 21/02* | (2006.01) |
| *G08G 1/042* | (2006.01) |
| *G08G 1/017* | (2006.01) |
| *G08B 1/02* | (2006.01) |
| *G08G 1/04* | (2006.01) |
| *G08G 1/16* | (2006.01) |

(52) U.S. Cl.
CPC .......... *G08G 1/167* (2013.01); *B60K 35/00* (2013.01); *G08B 21/02* (2013.01); *G08G 1/166* (2013.01); *B60K 2370/167* (2019.05); *B60K 2370/168* (2019.05); *B60K 2370/179* (2019.05)

(58) Field of Classification Search
CPC .................................................... B60W 40/09
See application file for complete search history.

(56) References Cited

U.S. PATENT DOCUMENTS

| 8,180,527 B2 | 5/2012 | Mueller-Schneiders et al. |
| 2009/0093927 A1 | 4/2009 | Mueller-Schneiders et al. |
| 2010/0209890 A1* | 8/2010 | Huang .................. G09B 9/05 434/65 |
| 2016/0231746 A1 | 8/2016 | Hazelton et al. |

(Continued)

FOREIGN PATENT DOCUMENTS

| DE | 10 2014 211530 A1 | 12/2015 |
| DE | 10 2016 215565 A1 | 2/2018 |

(Continued)

OTHER PUBLICATIONS

Extended European Search Report for Application No. EP 20 20 6893 dated Mar. 30, 2021.

*Primary Examiner* — Joseph H Feild
*Assistant Examiner* — Pameshanand Mahase
(74) *Attorney, Agent, or Firm* — Carlson, Gaskey & Olds (57) ABSTRACT

A vehicle controller includes at least one input configured to receive sensor signals from a plurality of sensors configured to determine vehicle dynamic information and at least one input configured to receive sensor signals from a plurality of sensors configured to determine external vehicle information Included in the vehicle controller is a memory and a processor. The memory stores instructions for executing a vehicle positioning system and a driver assistance system using the controller. An output is configured to output a safe to pass condition in response to the controller determining an available vehicle power meets or exceeds an estimated power requirement for a passing operation.

18 Claims, 6 Drawing Sheets

(56) References Cited

U.S. PATENT DOCUMENTS

| | | | | |
|---|---|---|---|---|
| 2016/0325750 | A1* | 11/2016 | Kanda | B60W 30/18163 |
| 2018/0012492 | A1* | 1/2018 | Baldwin | G05D 1/0261 |
| 2018/0129215 | A1 | 5/2018 | Hazelton et al. | |
| 2018/0148063 | A1* | 5/2018 | Tatsushiro | B60W 20/12 |
| 2019/0066498 | A1 | 2/2019 | Baldwin et al. | |
| 2019/0118795 | A1* | 4/2019 | Hoffmann | B60W 20/13 |
| 2020/0039363 | A1* | 2/2020 | Degand | B60W 30/18163 |
| 2020/0174134 | A1* | 6/2020 | Stiller | G01S 17/46 |

FOREIGN PATENT DOCUMENTS

| | | |
|---|---|---|
| DE | 10 2017 104592 A1 | 9/2018 |
| DE | 10 2017 206694 A1 | 10/2018 |

\* cited by examiner

PROCESS AND SYSTEM FOR ASSISTING VEHICLE OPERATIONS WITH SAFE PASSING

TECHNICAL FIELD

The present disclosure relates generally to automated driver assistance systems, and more specifically to an automotive driver assistance systems including a safe passing assistance feature.

BACKGROUND

Operators of vehicles, such as commercial shipping trucks, busses, and similar large vehicles with variable weights, typically rely on their vision and line of sight to determine whether it is safe to pass a vehicle and merge back into their current lane. When the vehicle operator makes a miscalculation, the passing operation can take longer or be more difficult than anticipated and can result in a significant traffic backup or an unsafe driving condition as the vehicle attempts to complete the passing operation. To assist in such operations, current vehicle operators typically utilize radio communications with other vehicle operators to determine a passing availability.

SUMMARY OF THE INVENTION

In one example, a method for determining a safe passing window includes identifying an initiation of a passing operation and responding to the passing operation by determining vehicle positioning information, vehicle dynamic information, and external information, determining an estimated power requirement based at least in part on the determined vehicle positioning information, the determined vehicle dynamic information, and the external information, comparing the estimated power requirement to an available vehicle power, and indicating a safe to pass condition in response to the available vehicle power meeting or exceeding the estimated power requirement.

In another example of the above method, identifying the initiation of a passing operation includes at least one of detecting a turn signal initiation, a deviation from a lane, and a deviation from a road direction.

In another example of any of the above methods, the vehicle positioning information includes global navigation satellite system (GNSS) positioning data and road gradient map data.

In another example of any of the above methods, the road gradient map data is a road gradient map data within a predetermined distance of at least 0.25 miles (0.40 km) from the vehicle.

In another example of any of the above methods, the vehicle dynamic information includes at least one of a vehicle speed, an engine speed and an available power.

In another example of any of the above methods, the vehicle dynamic information includes all of the vehicle speed, the engine speed, and the available power.

In another example of any of the above methods, indicating the safe to pass condition in response to the available vehicle power meeting or exceeding the estimated power requirement includes calculating a safe passing window, determining that current conditions are safe for a passing operation, indicating a currently safe to pass condition, and ending the passing operation in response to verifying that the passing operation is completed.

Another example of any of the above methods includes verifying that the safe passing window is still available in response to determining that current conditions are not safe for the passing operation.

Another example of any of the above methods includes updating a remaining duration of the safe to pass condition in response to determining that the safe to pass condition is still present.

Another example of any of the above methods includes providing an indication that the safe passing window is closed to a vehicle operator, thereby ending a safe passing process.

Another example of any of the above methods includes returning to determining that current conditions are safe for a passing operation in response to determining that that the passing operation is ongoing.

In one example a vehicle controller includes at least one put configured to receive sensor signals from a plurality of sensors configured to determine vehicle dynamic information and at least one input configured to receive sensor signals from a plurality of sensors configured to determine external vehicle information, a memory and a processor, the memory storing instructions for executing a vehicle positioning system and a driver assistance system using the controller, and an output configured to output a safe to pass condition in response to the controller determining an available vehicle power meets or exceeds an estimated power requirement for a passing operation.

In another example of the above described vehicle controller, the driver assistance system is a software module of the vehicle controller.

In another example of any of the above described vehicle controllers, executing the driver assistance system includes determining an initiation of a passing operation and responding to the determination by determining vehicle positioning information, vehicle dynamic information, and external information, determining an estimated power requirement based at least in part on the determined vehicle positioning information, the determined vehicle dynamic information, and the determined external information, comparing the estimated power requirement to an available vehicle power, and indicating the safe passing condition in response to the available vehicle power meeting or exceeding the estimated power requirement.

In another example vehicle controller according to any of the above examples, the vehicle dynamic information includes at least one of a vehicle speed, an engine speed and an available power.

Another example vehicle controller according to any of the above vehicle controllers includes one of a vehicle to vehicle, a vehicle to infrastructure, and a vehicle to everything system.

In another example vehicle controller according to any of the above examples, the output is configured to cause a display to indicate the safe to pass condition.

In another example vehicle controller according to any of the above examples, the display includes at least one of a duration element configured to indicate a remaining duration of the safe to pass condition, a distance element configured to indicate a length of travel required for the vehicle to reach a safe merge point and a speed element configured to indicate a required speed for the vehicle to reach the safe merge point within the defined safe passing window.

In one example, a non-transitory computer readable medium stores instructions for causing a vehicle controller to perform the steps of determining an initiation of a passing operation and responding to the determination by determining vehicle positioning information, vehicle dynamic information, and external information, determining an estimated power requirement based at least in part on the determined sets of information, comparing the estimated power requirement to an available vehicle power, and indicating a safe passing window in response to the available vehicle power meeting or exceeding the estimated power requirement.

In another example of the above non-transitory computer readable medium, the step of indicating the safe passing window in response to the available vehicle power meeting or exceeding the estimated power requirement includes calculating a safe passing window, determining that current conditions are safe for a passing operation, indicating a currently safe to pass condition, and ending the passing operation in response to verifying that the passing operation is completed.

These and other features of the present invention can be best understood from the following specification and drawings, the following of which is a brief description.

DETAILED DESCRIPTION

Figure 1:
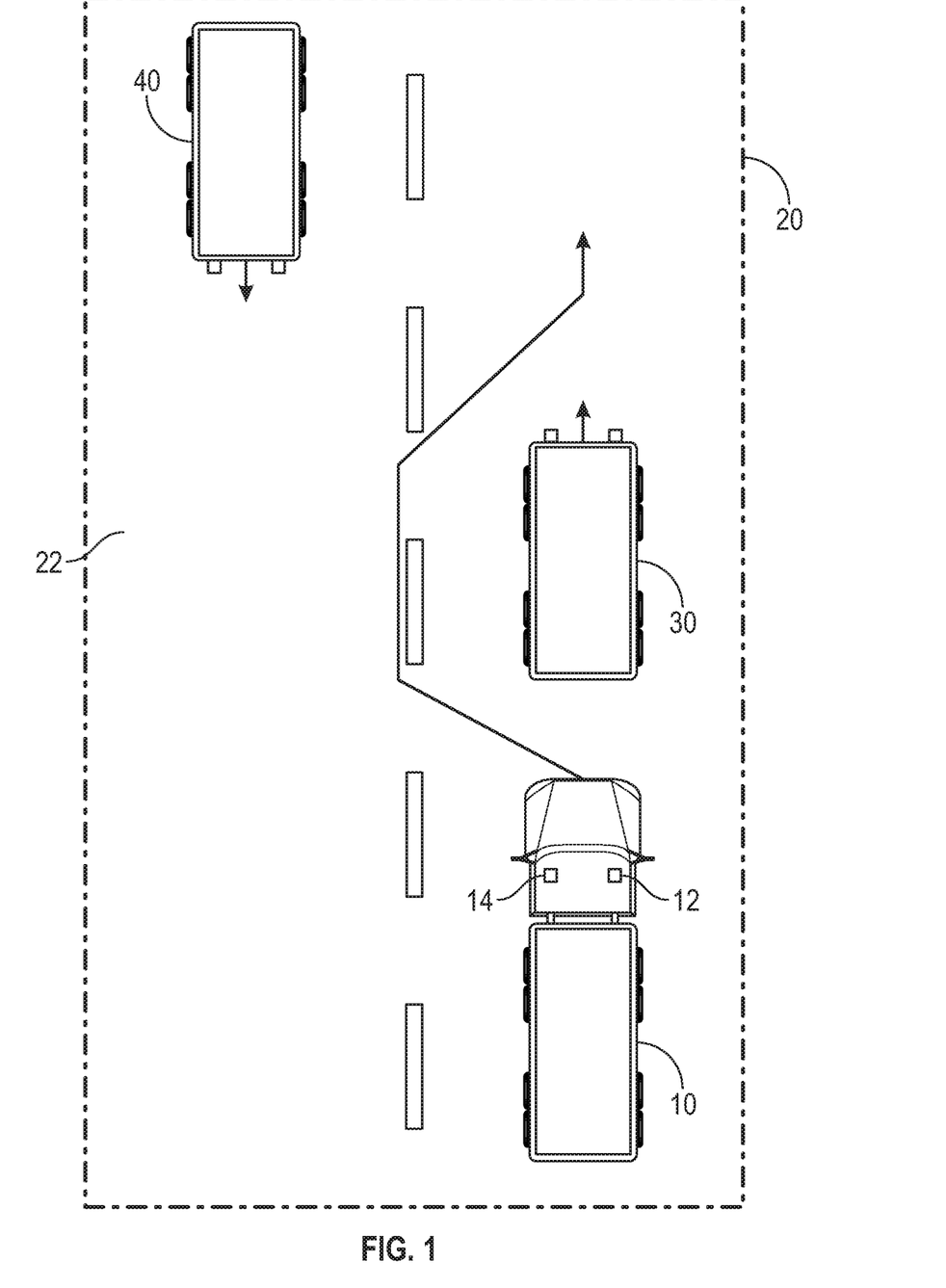
FIG. 1 illustrates an exemplary passing operation.

FIG. 1 schematically illustrates a vehicle, such as a truck 10, initiating a passing operation on a two-lane road 20. In the example, the truck 10 desires to pass a slower moving vehicle 30. An oncoming vehicle 40 is approaching in the passing lane 22, leading to a limited time and or distance which the passing operation must be completed in order to avoid a collision. The limited time and or distance is referred to as the safe passing window.

Exacerbating the difficulty of such operations is the fact that at least a portion of the factors determining the safe passing window may not be known to the operator of the truck 10. In such an instance, a driver assistance system 12 within the truck 10 can provide the operator with one or more indicators of the safe passing window, including whether it is safe to initiate a passing operation, the duration of time expected for the passing operation to complete, a speed necessary to complete the passing operation safely, or any similar information. The driver assistance system 12 includes multiple inputs connected to sensors through the vehicle and or an engine controller that is configured to pass sensor information to the driver assistance system 12. In some examples, the driver assistance system 12 is an independent system. In other examples, the driver assistance system 12 is incorporated in the vehicle controller 14.

Figure 2:
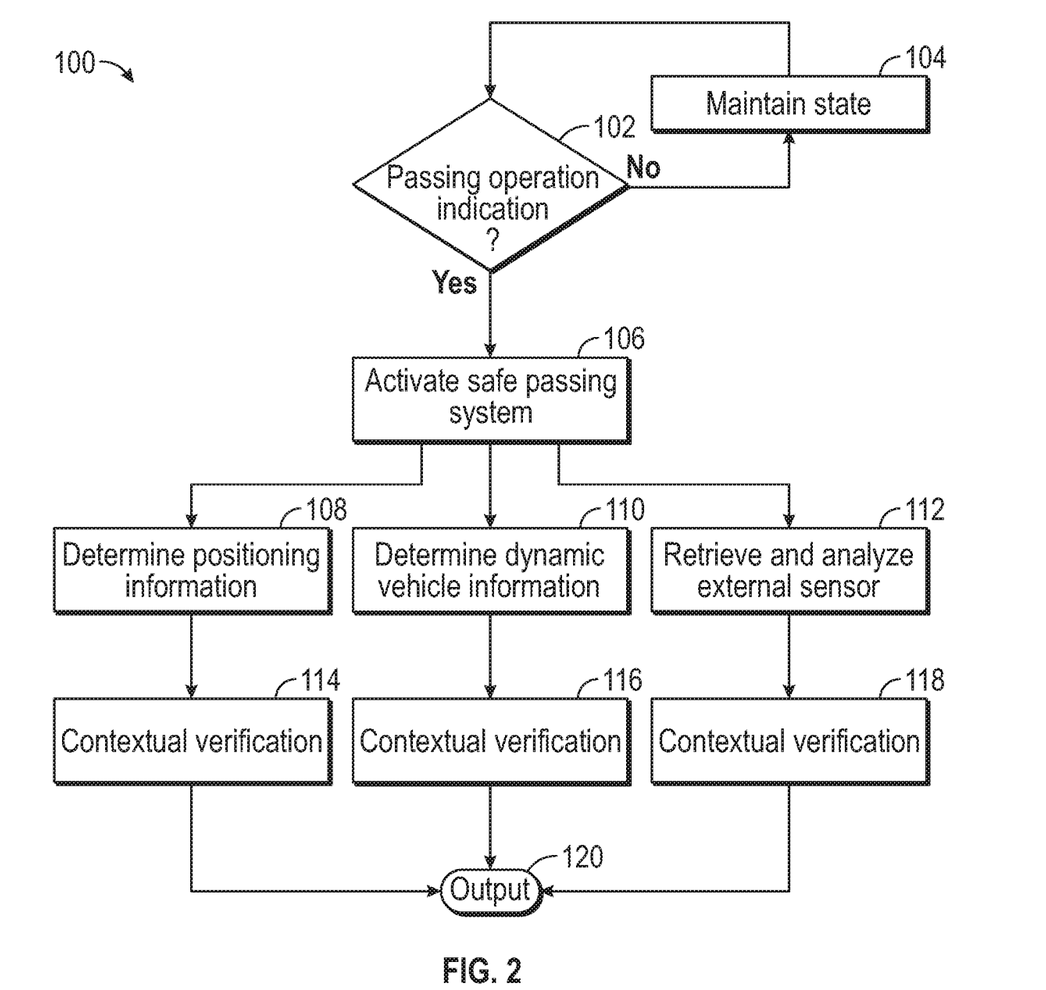
FIG. 2 illustrates an exemplary procedure for initiating a safe passing window determination using a driver assistance system.

With continued reference to FIG. 1, FIG. 2 illustrates an exemplary process 100 for initiating a safe passing window determination using the driver assistance system 12. The driver assistance system 12 determines the safe passing window based at least in part on multiple factors, including available engine power of the truck 10 initiating the passing operation, the grade of the road 20, the current speed of the vehicle 30 being passed, the truck 10 initiating the passing operation and the speed of the oncoming vehicle 40, and any similar factors with available data.

To initiate the process, the driver assistance system 12 receives an indication that a passing operation has begun or is about to begin in a "Passing Operation Indication" step 102. The passing operation indication can include a turn indicator, such as a turn signal, initiated by the operator of the truck 10, a vehicle sensor indicating that the vehicle is changing lanes, a safe passing window request from the vehicle operator or any other means for indicating that a safe passing operation is about to begin.

Once the driver assistance system 12 receives the indication, the driver assistance system 12 verifies with the operator that a safe passing operation is about to begin. If the operator indicates that a passing operation is not about to begin, the driver assistance system 12 returns to a default state in a maintain state step 104.

If the driver confirms that a safe passing operation s about to begin, the driver assistance system 12 activates a safe passing system in an "Activate Safe Passing System" step 106. Upon activating the safe passing system, the driver assistance system 12 begins collecting information in a "Determine Positioning Information" step 108, a "Determine Dynamic Vehicle Information" step 110, "Retrieve and Analyze External Sensors" step 112.

In the determine positioning information step 108, the driver assistance system 12 uses centimeter level global navigation satellite system positioning, or similar positioning system, to determine a position of the truck 10. The determined position is correlated with high definition mapping information, including road gradients, road directions, etc. and the exact position of the vehicle relative to the road is determined. The map information can be statically stored within a memory onboard the truck 10, or remotely stored and accessed via wireless communications when needed by the driver assistance system 12 depending on the configuration of the particular truck 10 incorporating the driver assistance system 12. Once the exact position of the road is determined, the upcoming road gradients for a predetermined distance from the truck 10 are determined based on the stored map information. In some examples, the determined grade distance can include the road grade details for at least ¼ mile ahead of the truck 10 along its current route. In some examples a V2X system can further determine a hole, or safe merging position, for the vehicle 10 to re-enter the lane at the end of a passing operation and the position of the determined hole can be further used in conjunction with the map information and the determined position. The information determined in the determine positioning information step 108 is referred to as vehicle positioning information.

In the determine dynamic vehicle information step 110, dynamic information including rate of speed as a function of the vehicle load and engine speed as a function of vehicle load are determined, Using the current vehicle speed and engine speed, as well as the load of the truck 10, the driver assistance system determines the available power for operating at a sufficient speed to pass the vehicle(s) 30 in front of the truck 10. In one example, the speed is set at a speed increase of 10 miles per hour over the current speed. This information is collectively referred to as determined vehicle dynamic information.

In the Retrieve and Analyze external sensors step 112, data from vehicle sensors, such as cameras, accelerometers, and the like that analyze elements external to the truck 10 is gathered by either a vehicle controller, or the driver assistance system 12 and analyzed to determine corresponding information external to the truck 10. Included within these external sensors can be front facing sensors and cameras, rear facing sensors and cameras, side facing sensors and cameras, and vehicle to vehicle or vehicle to infrastructure communication systems. Alternatively, any other system configured to provide information regarding the surrounding environment, or nearby vehicles and their current speeds can be polled in this step 112 as well. Data determined by, or derived from, the external sensors is referred to collectively as external vehicle information.

After all of the data has been gathered, the data is verified for accuracy by applying contextual checks in a corresponding "Contextual Verification" step 114, 116, 118. The contextual verification is performed by either the driver assistance system 12, or a vehicle controller and uses relevant or related sensors data to determine an accuracy of the data determined in steps 108, 110 and 112. By way of example, the determined vehicle dynamic information may indicate that the truck is traveling at 35 miles per hour, while the external sensors indicate that the surrounding environment is passing at 70 miles per hour. In such an example, the driver assistance system 12 determines that contextually the external sensors are providing faulty information, and the data determined by them can either be corrected, re-polled, or discarded depending on the configuration of the specific driver assistance system 12. While only one exemplary contextual check is described herein, it is appreciated that any contextual check on the data determined in steps 108, 110, and 112 can be performed.

Figure 3:
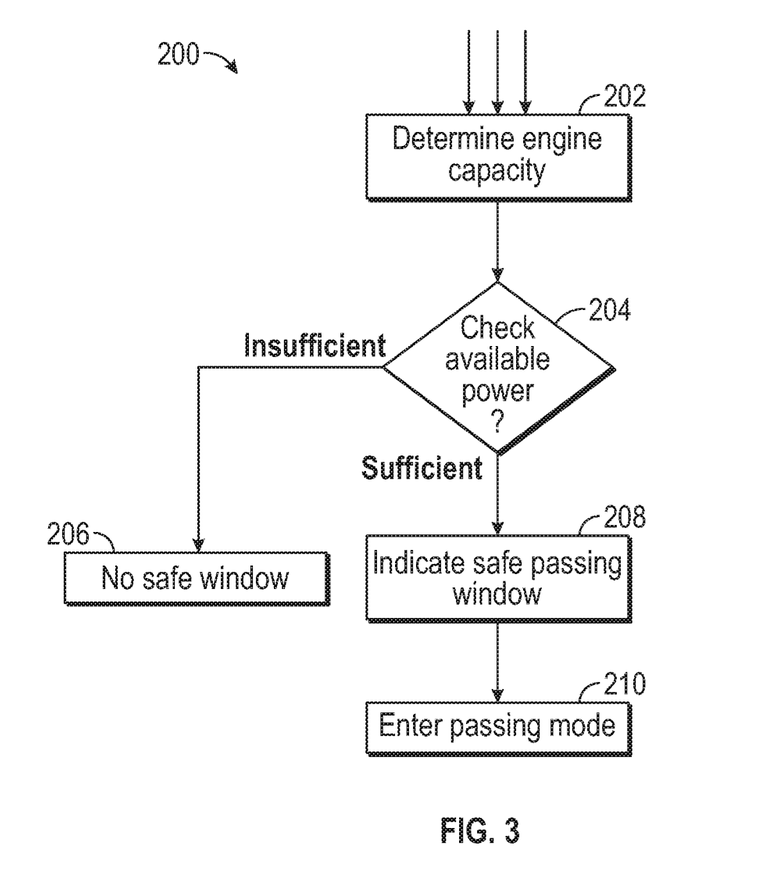
FIG. 3 schematically illustrates an exemplary procedure for determining a passing window for the passing operation of FIG. 2.

Once all the data is verified via the contextual verification steps 114, 116, 118, the data is provided to a safe passing window determination process 200, illustrated in FIG. 3, via an output step 120.

With continued reference to FIGS. 1 and 2, FIG. 3 illustrates the process 200 by which the driver assistance system 12 determines the safe passing window for the truck 10. In the process 200, the driver assistance system 12 initially uses the determined data in the process 100 for initiating a safe passing window, combined with a physics based force model to determine the required engine capacity for a passing operation in a "Determine Engine Capacity" step 202. The step 202 applies a force model, accounting for the environment of the road as determined by the exterior sensors and the positioning data, as well as the number of vehicles to be passed, the grade of the road, and similar factors, to determine the amount of power required from the engine to perform the passing operation at a predefined speed increase. By way of example, the predefined speed increase could be a 10 mile per hour increase over the current speed of the truck 10. In alternative examples, another speed increase sufficient to pass the vehicles can be used in place of 10 miles per hour to the same effect. In some examples, the force model can include weather data, such as icy road conditions, wet road conditions, wind resistance, and, the like.

Once the required engine capacity has been determined, the driver assistance system 12 compares the required engine power against the available engine power in a "Check Available Power" step 204. The available engine power is a representation of unused engine capacity and is drawn from a vehicle controller. When the available engine capacity is insufficient to perform the passing operation, the driver assistance system 12 provides an indication that there is no safe window in a "No Safe Window" step 206. The indication can include a visual indicator on a dashboard screen, an auditory indicator, or any other way to indicate that there is no safe passing window.

Alternatively, if there is sufficient engine power, the process 200 provides an indication that it is safe to pass, or that a safe passing window is approaching, in an "Indicate Safe Passing Window" step 208. As with the no safe passing window indication, the indication can be any form of auditory, visual, haptic, or any combination of auditory, visual and haptic indication. Once the driver assistance system 12 has indicated the safe passing window, the driver assistance system 12 enters a passing mode in an "Enter Passing Mode" step 210.

In some implementations the passing mode can be as simple as the audio and/or visual indicator showing that it is safe for the driver to pass. In alternative examples, the passing mode can be substantially more complex and include additional detail provided to the driver of the truck 10 through a display screen. With continued reference to FIGS. 1-3, FIG. 4 illustrates one such example passing mode 300 operation.

Figure 4:
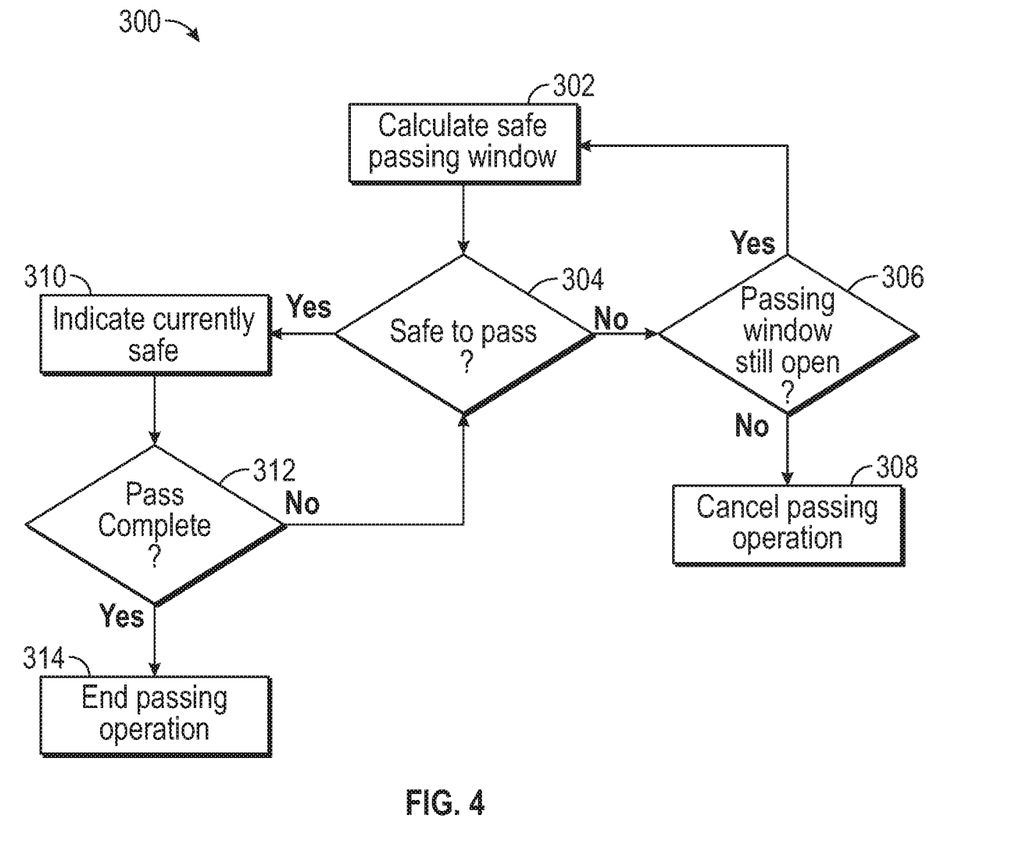
FIG. 4 schematically illustrates an exemplary procedure for assisting a driver in performing a passing operation.

Initially the passing operation 300 of FIG. 4 calculates when the safe passing window will be in a "Calculate Safe Passing Window" step 302. The calculation includes calculating a time until a safe merge in front of the vehicles 30 being passed will occur, a distance required to safely merge in front of the vehicles 30 being passed, a distance countdown and a time countdown until the safe merge is expected to be completed. Once the safe passing window has been calculated, the process 300 checks to determine if a passing operation is safe to begin and/or continue in a "Safe to Pass" check 304. If the check determines that the passing operation is not currently safe, a "Passing Window Still Open" check 306 is performed, if the passing window is still open, the system returns to the calculate safe passing window step 302 and continues to count down until the safe passing window closes.

If the check 306 determines that the passing window is no longer still open, the passing operation is canceled in a "Cancel Passing Operation" step 308. In the cancel passing operation step 308, the process 300 provides an indication via the user interface illustrated in FIG. 5, or any other indication, that the passing operation is can no longer be completed, and the operator can respond accordingly.

If, instead, the safe to pass check 304 indicates that it is currently safe to pass, the process 300 proceeds to indicate that it is currently safe to pass on a display screen visible to the vehicle operator in an "Indicate Currently Safe" step 310. The display screen can include a length of time the passing operation is expected to take, a speed required in order to complete the passing operation safely, a clearance required to safely merge after passing the vehicle(s) 30 and any similar information that will assist the driver in completing the passing operation. Once the information is provided, the process 300 checks to see if the passing operation is fully completed in a "Pass Complete" check 312. The check can be performed by prompting the operator to confirm when the pass is completed, by contextual information from external sensors, by reviewing vehicle position data, or any combination thereof. When the pass is not complete, the process 300 returns to the safe to pass check 304. When the pass is complete, the process 300 ends the passing operation in an "End Passing Operation" step 314.

With continued reference to FIGS. 1-4, FIG. 5 schematically illustrates an exemplary display 400 for displaying a safe passing process, such as the process 300 of FIG. 4. Included within the display is the vehicle 410 being operated, at least one vehicle 420 being passed, as well as an arrow 412, or other indicator showing the direction of travel of the vehicle 410 being operated. Also included within the display is a duration element 430 indicating the remaining duration of the safe passing window (i.e. the duration during which a safe to pass condition exists), a distance element 440 indicating a length of travel required for the vehicle 410 to reach a safe merge point and a speed element 450 indicating a required speed for the vehicle 410 to reach the safe merge point within the defined safe passing window.

Figure 5:
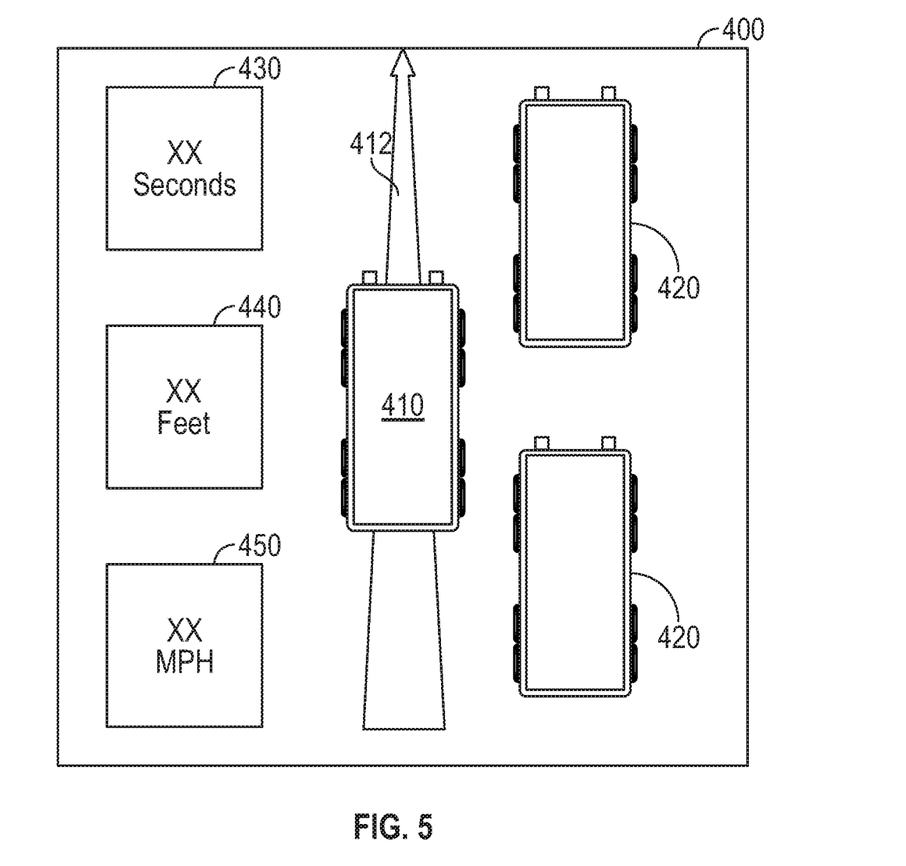
FIG. 5 schematically illustrates an exemplary user interface.

While an exemplary display 400 is provided here, one of skill in the art will appreciate that the display can be configured in alternative manners and provide additional information depending on the needs of a particular implementation.

Figure 6:
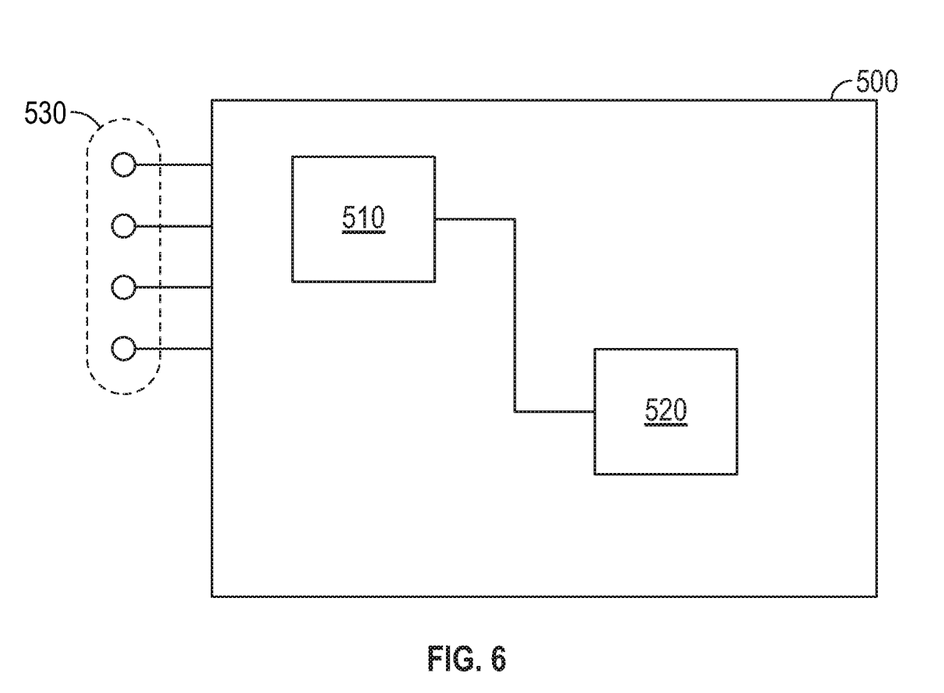
FIG. 6 schematically illustrates an exemplary vehicle controller according to one embodiment.

While described above as a distinct system from the vehicle controller, it should be appreciated that the driver assistance system 12 can be a software module, or a combination of hardware devices and a software module within the vehicle controller and provide the same functionality and operations described above. In one such example, illustrated in FIG. 6, a controller 500 includes a memory 510 and a processor 520. The memory 510 is a non-transitory computer readable medium and stores instructions configured to cause the processor 520 to operate the method of FIGS. 2-4. Also included in the controller 500 is a set of inputs 530 each of which is connected to one or more vehicle sensors of the vehicle 10 (see FIG. 1). The data received at the inputs 530 is provided to the processor 520 and utilized in the method of FIGS. 2-4.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for determining a safe passing window for a driver of a vehicle to complete a passing operation, the method comprising:
    identifying an initiation of a passing operation by the driver of the vehicle and responding to the initiation by determining vehicle positioning information, vehicle dynamic information, and external information;
    determining an estimated power requirement based at least in part on the determined vehicle positioning information, the determined vehicle dynamic information, and the determined external information;
    comparing the estimated power requirement to an available vehicle power; and
    indicating a safe to pass condition in response to the available vehicle power meeting or exceeding the estimated power requirement.

2. The method of claim 1, wherein identifying the initiation of the passing operation by the driver of the vehicle comprises detecting at least one of a turn signal initiation, a deviation from a lane, and a deviation from a road direction.

3. The method of claim 1, wherein the vehicle positioning information comprises global navigation satellite system (GNSS) positioning data and road gradient map data.

4. The method of claim 3, wherein the road gradient map data is a road gradient map data within a predetermined distance of at least 0.25 miles (0.40 km) from the vehicle.

5. The method of claim 1, wherein the vehicle dynamic information includes at least one of a vehicle speed, an engine speed and an available power.

6. The method of claim 5, wherein the vehicle dynamic information includes all of the vehicle speed, the engine speed, and the available power.

7. The method of claim 1, wherein indicating the safe to pass condition in response to the available vehicle power meeting or exceeding the estimated power requirement comprises:
    calculating a safe passing window;
    determining that current conditions are safe for a passing operation;
    indicating a currently safe to pass condition; and
    ending the indicating in response to verifying that the passing operation is completed.

8. The method of claim 7, comprising verifying that the safe passing window is still available in response to determining that current conditions are not safe for the passing operation.

9. The method of claim 8, comprising updating a remaining duration of the safe to pass condition in response to determining that the safe to pass condition is still present.

10. The method of claim 8, comprising providing an indication that the safe passing window is closed to a vehicle operator, thereby ending a safe passing process.

11. The method of claim 7, comprising returning to determining that current conditions are safe for a passing operation in response to determining that that the passing operation is ongoing.

12. A vehicle controller comprising:
    at least one input configured to receive sensor signals from a plurality of sensors configured to determine vehicle dynamic information and sensor signals from a plurality of sensors configured to determine external vehicle information;
    a memory and a processor, the memory storing instructions that are executable by the processor and that cause the processor to
        determine an initiation of a passing operation by a driver of the vehicle;
        respond to the initiation by determining vehicle positioning information, vehicle dynamic information, and external information;
        determine an estimated power requirement based at least in part on the determined vehicle positioning information, the determined vehicle dynamic information, and the determined external information;
        compare the estimated power requirement to an available vehicle power; and
        determine that there is a safe to pass condition in response to the available vehicle power meeting or exceeding the estimated power requirement; and
    an output configured to output an indication of the safe to pass condition in response to the processor determining that the safe to pass condition exists.

13. The vehicle controller of claim 12, wherein the vehicle dynamic information comprises at least one of a vehicle speed, an engine speed and an available power.

14. The vehicle controller of claim 12, further comprising one of a vehicle to vehicle, a vehicle to infrastructure, and a vehicle to everything system.

15. The vehicle controller of claim 12, wherein the output comprises a display that provides a visual indication of the safe to pass condition.

16. The vehicle controller of claim 15, wherein the visual indication includes at least one of a duration element configured to indicate a remaining duration of the safe to pass condition, a distance element configured to indicate a length of travel required for the vehicle to reach a safe merge point and a speed element configured to indicate a required speed for the vehicle to reach a safe merge point within a defined safe passing window.

17. A non-transitory computer readable medium storing instructions for causing a vehicle controller to perform the steps of:
- determining an initiation of a passing operation by a driver of a vehicle and responding to the initiation by determining vehicle positioning information, vehicle dynamic information, and external information;
- determining an estimated power requirement based at least in part on the determined vehicle positioning information, the determined vehicle dynamic information, and the determined external information;
- comparing the estimated power requirement to an available vehicle power; and
- indicating a safe passing window in response to the available vehicle power meeting or exceeding the estimated power requirement.

18. The non-transitory computer readable medium of claim 17, wherein the step of indicating the safe passing window in response to the available vehicle power meeting or exceeding the estimated power requirement comprises:
- calculating a safe passing window;
- determining that current conditions are safe for a passing operation;
- indicating a currently safe to pass condition; and
- ending the indicating in response to verifying that the passing operation is completed.

* * * * *